(12) United States Patent
Kim (10) Patent No.: US 9,454,650 B2
(45) Date of Patent: Sep. 27, 2016

(54) SYSTEM AND METHOD FOR UPDATING INFORMATION CAPABLE OF PROVIDING MEDIA CONTENT

(71) Applicant: HUMAX Co., Ltd., Yongin (KR)

(72) Inventor: Dong Hwan Kim, Seoul (KR)

(73) Assignee: HUMAX CO., LTD., Yongin (KR)

( * ) Notice: Subject to any disclaimer, the term of this patent is extended or adjusted under 35 U.S.C. 154(b) by 0 days.

(21) Appl. No.: 14/525,021

(22) Filed: Oct. 27, 2014

(65) Prior Publication Data

US 2015/0135339 A1    May 14, 2015

(30) Foreign Application Priority Data

Nov. 14, 2013  (KR) .................. 10-2013-0138158

(51) Int. Cl.
| | | |
|---|---|---|
| *G06F 21/00* | (2013.01) | |
| *G06F 21/10* | (2013.01) | |
| *H04W 4/06* | (2009.01) | |
| *H04N 21/436* | (2011.01) | |
| *H04N 21/482* | (2011.01) | |
| *H04N 21/458* | (2011.01) | |

(52) U.S. Cl.
CPC ........ *G06F 21/10* (2013.01); *H04N 21/43615* (2013.01); *H04N 21/4586* (2013.01); *H04N 21/482* (2013.01); *H04W 4/06* (2013.01); *G06F 2221/0775* (2013.01)

(58) Field of Classification Search
CPC ............ G06F 21/10; G06F 221/0775; H04N 21/43615; H04N 21/482; H04N 21/4826; H04W 4/06
See application file for complete search history.

(56) References Cited

U.S. PATENT DOCUMENTS 9,258,609 B2 *   2/2016  Odryna ............. H04N 21/4622
2009/0300679 A1  12/2009  Hiroi et al.
(Continued)

FOREIGN PATENT DOCUMENTS

| EP | 2 000 917 A1 | 12/2008 |
| EP | 2 555 539 A1 | 2/2013 |

(Continued)

OTHER PUBLICATIONS

Extended European Search Report for European Application No. 14190360.9, dated May 8, 2015.

(Continued)

*Primary Examiner* — Taghi Arani
*Assistant Examiner* — Sharon Lynch (57) ABSTRACT

Disclosed herein are a system and method for updating information capable of providing media content, wherein when a service restriction is generated in a DMS in a home network system based on DLNA. The system include a DMS configured to send service limitation information to DMPs when service limitation is generated and to send an unable content list to a specific DMP of the DMPs when a request for the unable content list is received from the specific DMP and the DMPs each configured to request the unable content list from the DMS when receiving the service limitation information from the DMS, receive the unable content list from the DMS, and update a content list by applying the received unable content list to the content list.

9 Claims, 5 Drawing Sheets

(56) References Cited

U.S. PATENT DOCUMENTS

| | | | |
|---|---|---|---|
| 2010/0281508 A1* | 11/2010 | Poder | H04N 21/2221 725/93 |
| 2010/0318860 A1* | 12/2010 | Ohbi | H04N 5/765 714/700 |
| 2010/0333137 A1 | 12/2010 | Hamano et al. | |
| 2012/0089699 A1 | 4/2012 | Cholas | |
| 2012/0174161 A1 | 7/2012 | Mathews et al. | |
| 2013/0152138 A1* | 6/2013 | Jeong | G06F 3/0346 725/59 |
| 2015/0142883 A1* | 5/2015 | Ohbi | H04N 5/765 709/203 |
| 2016/0119678 A1* | 4/2016 | Odryna | H04N 21/4622 725/49 |

FOREIGN PATENT DOCUMENTS

| | | |
|---|---|---|
| KR | 10-2012-0094350 A | 8/2012 |
| WO | WO 2012/072107 A1 | 6/2012 |
| WO | WO 2012/111924 A2 | 8/2012 |
| WO | WO 2013/153765 A1 | 10/2013 |

OTHER PUBLICATIONS

Rolf Johansson, "Converging Requirements on the Residential Gateway", Commercial in Confidence, Oct. 6, 2005, pp. 1-19, ERICSSON.

* cited by examiner

STB 1 Example

| Home VOD | Movie 1 – HMS2 | Drama 1 – HMS1, NAS | Movie 2 – HMS1 |
|---|---|---|---|
| | 13:00  14:00 | 15:00 | 16:00 |

RF Channel 1
RF Channel 2
Home IP Channel 1 - SAT>IP, HMS1
Home IP Channel 2 - HMS1
Home IP Channel 3 - HMS2

- HMS1- Impossible service due to limited resources
- HMS2- Possible service
- Home IP Channel 1 ? SAT>IP, Service is possible through SAT>IP by transmission of HMS1
- Home IP Channel 2 ? Service is impossible through only transmission by HMS2
- Drama 1 ? Service is possible through NAS because content is stored in HMS1, NAS
- Movie 2 ? Service is impossible because content is stored in HMS1

SYSTEM AND METHOD FOR UPDATING INFORMATION CAPABLE OF PROVIDING MEDIA CONTENT

BACKGROUND OF THE INVENTION

1. Field of the Invention

Exemplary embodiments of the present invention relate to a system and method for updating whether or not a media server may provide media content in real time in a home network system based on Digital Living Network Alliance (DLNA).

2. Description of the Related Art

DLNA standardization for establishing a guide line that needs to be observed for interoperability between a variety of types of devices at homes or offices and authenticating whether or not the guide line is observed continues to be performed.

DLNA enables a variety of types of devices, such as digital AV devices or personal computers connected over a home network, to interoperate with each other, thereby enabling the variety of types of devices within the home network to share content, such as music, moving images, and still images.

Devices subjected to DLNA authentication within a home network interoperate with each other over wired/wireless networks. That is, DLNA is based on Universal Plug and Play (UPnP), and enables digital devices, such as electric home appliances, PCs, and wireless devices manufactured by different manufacturers, to connect with each other over a wired/wireless home network and to share content.

Content may be shared between DLNA authentication terminals based on such a characteristic of DLNA. In order to search for content stored in one or more DLNA authentication terminals including storage regions, a query language based on text is transmitted, each of the DLNA authentication terminals searches for content similar to the query language and the DLNA authentication terminals share the content over a home network.

Such a content sharing technology based on DLNA may be applied to only content not having Digital Rights Management (DRM). The playback of content having DRM by a terminal not having a corresponding DRM license is limited.

In DLNA, a Digital Media Server (DMS) provides Digital Media Players (DMPs) with content and a metadata list, and the access of a DMP to content not having related DRM license is rejected.

If a restriction is generated in a DMS in terms of performance or a system, however, the DMS may not provide media service to DMPs. In such a case, there is a problem in that whether media content can be played back or not is unaware until a user accesses the DMS and requests the playback of the media content.

Furthermore, there is a problem in that corresponding media content has to be selected again if a plurality of DMSs has the same media content.

SUMMARY OF THE INVENTION

An object of the present invention is to provide a system and method for updating information capable of providing media content, wherein when a service restriction is generated in a DMS in a home network system based on DLNA, a home multicast group is notified of the service restriction and DMPs belonging to the home multicast group receive information about content that is unable to be served from the DMS, thereby notifying users of the information.

In accordance with an aspect of the present invention for achieving the object of the present invention, there is provided a system for updating information capable of providing media content, including a Digital Media Server (DMS) configured to send service limitation information to a plurality of Digital Media Players (DMPs) when service limitation is generated and to send an unable content list to a specific DMP of the plurality of DMPs when a request for the unable content list is received from the specific DMP and the specific DMP configured to request the unable content list from the DMS when receiving the service limitation information from the DMS, receive the unable content list from the DMS, and update a content list by applying the received unable content list to the content list.

Furthermore, the DMS is configured to send the service limitation information to the plurality of DMPs using a multicast method.

Furthermore, the DMS is configured to send the service limitation information to the plurality of DMPs through a Simple Service Discovery Protocol (SSDP) notification using a multicast method.

Furthermore, the specific DMP is configured to request the unable content list from the DMS using a unicast method, and the DMS is configured to send the unable content list to the DMP using a unicast method.

Furthermore, the DMS is configured to immediately send the unable content list or an available content list to the plurality of DMPs using a multicast method if the number of the unable content is equal to or smaller than a predefined number when the service limitation is generated.

Furthermore, the DMS and the DMP are used in a home network system based on Digital Living Network Alliance (DLNA).

In accordance with another aspect of the present invention, there is provided a DMS for providing media content to a plurality of DMPs, including a communication unit configured to communicate with the plurality of DMPs; a content information DB configured to store media content and a content list to be provided to the plurality of DMPs; a content providing unit configured to provide the media content and the content list to the plurality of DMPs; a service limitation detection unit configured to detect service limitation regarding a providing of the media content; a content list generation unit configured to sort unable content from the content list and generate an unable content list using the unable content; and a control unit configured to perform control so that service limitation information is transmitted to the plurality of DMPs when service limitation regarding the providing of the media content is generated, so that the unable content is sorted from the content list and the unable content list is generated using the sorted unable content when a request for the unable content list is received from a specific DMP of the plurality of DMPs, and so that the unable content list is transmitted to the specific DMP.

Furthermore, the control unit is configured to perform control so that the service limitation information is transmitted through the communication unit using a multicast method and the unable content list is transmitted through the communication unit using a unicast method.

Furthermore, the control unit is configured to immediately send the unable content list or an available content list to the plurality of DMPs using a multicast method if the number of the unable content is equal to or smaller than a predefined number when service limitation is generated.

Furthermore, the control unit is configured to perform control so that the service limitation information is transmitted to the plurality of DMPs through an SSDP notification using a multicast method.

In accordance with yet another aspect of the present invention, there is provided a method for updating information capable of providing media content in a system including a DMS and a plurality of DMPs, including the steps of (a) sending, by the DMS, service limitation information to the plurality of DMPs using a multicast method when service limitation is generated; (b) requesting, by a specific DMP of the plurality of DMPs, an unable content list from the DMS; (c) generating, by the DMS, the unable content list corresponding to the service limitation and sending the generated unable content list to the specific DMP; and (d) receiving, by the specific DMP, the unable content list and updating a content list by applying the received unable content list to the content list.

Furthermore, the step (a) includes sending, by the DMS, the service limitation information to the plurality of DMPs through an SSDP notification using a multicast method.

Furthermore, the step (a) includes immediately sending, by the DMS, the unable content list or an available content list to the plurality of DMPs using a multicast method if the number of the unable content is equal to or smaller than a predefined number when the service limitation is generated.

Furthermore, the step (b) includes requesting, by the specific DMP, the unable content list from the DMS using a unicast method, and the step (c) includes sending, by the DMS, the unable content list to the specific DMP using a unicast method.

In accordance with further yet another aspect of the present invention, there is provided a method for updating information capable of providing media content in a DMS for providing media content to a plurality of DMPs, including the steps of (a) detecting, by a service limitation detection unit, service limitation regarding media content to be provided to the plurality of DMPs; (b) sending, by a control unit, service limitation information to the plurality of DMPs through a communication unit when the service limitation is detected; (c) receiving, by the communication unit, a request for an unable content list from a specific DMP of the plurality of DMPs; (d) sorting, by a content list generation unit, unable content from a content list and generating the unable content list using the unable content; and (e) sending, by the control unit, the unable content list to the specific DMP through the communication unit.

Furthermore, the step (b) includes sending the service limitation information using a multicast method, and the step (e) includes sending the unable content list using a unicast method.

Furthermore, the step (b) includes sending the service limitation information to the plurality of DMPs through an SSDP notification using a multicast method.

Furthermore, the step (e) includes performing, by the control unit, control so that the unable content list or an available content list is immediately transmitted to the plurality of DMPs using a multicast method if the number of the unable content is equal to or smaller than a predefined number at step (d).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The present invention may be modified in various ways and may have several embodiments. Specific embodiments of the present invention are illustrated in the drawings and are described in detail. It is however to be noted that the present invention is not intended to be limited to the specific embodiments, but is intended to include all modifications, equivalents, or substitutions which fall within the spirit and technical scope of the present invention.

Hereinafter, a system and method for updating information capable of providing media content in accordance with embodiments of the present invention are described in detail with reference to the accompanying drawings. In describing the embodiments of the present invention with reference to the accompanying drawings, the same reference numbers are used throughout the drawings to refer to the same or like parts, and redundant descriptions thereof are omitted.

Figure 1:
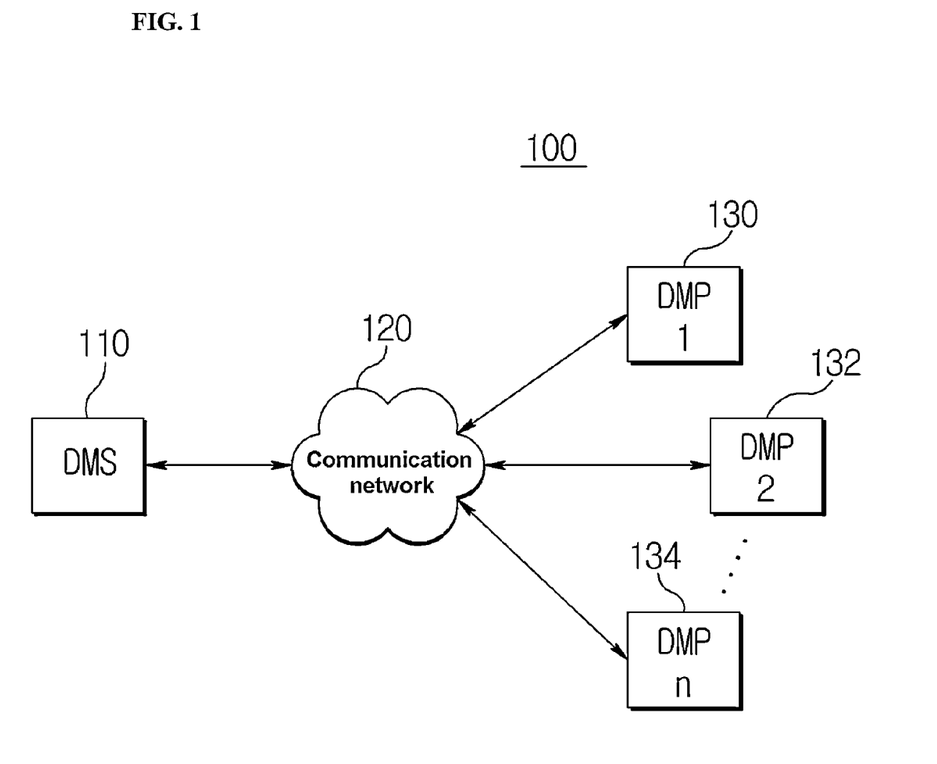
FIG. 1 is a diagram schematically illustrating an overall configuration of a system for updating information capable of providing media content in accordance with an embodiment of the present invention.

FIG. 1 is a diagram schematically illustrating an overall configuration of a system for updating information capable of providing media content in accordance with an embodiment of the present invention.

Referring to FIG. 1, the system 100 for updating information capable of providing media content in accordance with an embodiment of the present invention includes a Digital Media Server (DMS) 110, a communication network 120, and a plurality of Digital Media Players (DMPs) 130~134.

The DMS 110 sends service limitation information to the plurality of DMPs 130~134 when service limitation is generated, and sends an unable content list to a DMP (e.g., 130) when a request for the unable content list is received from the DMP 130 of the plurality of DMPs 130~134.

In this case, the DMS 110 sends the service limitation information to the plurality of DMPs 130~134 using a multicast method. That is, the DMS 110 sends the service limitation information to the plurality of DMPs 130~134 through a Simple Service Discovery Protocol (SSDP) notification.

The communication network 120 provides a communication path so that the DMS 110 provides media content to the DMPs 130~134.

When the service limitation information is received from the DMS 110, the DMPs 130~134 request the unable content list from the DMS 110, receive the unable content list from the DMS 110, and update their content lists.

In this case, the DMP 130 requests the unable content list from the DMS 110 using a unicast method, and the DMS 110 sends the unable content list to the DMP 130 using a unicast method.

Furthermore, the DMS 110 and the DMP 130 are used in a home network system based on Digital Living Network Alliance (DLNA).

Figure 2:
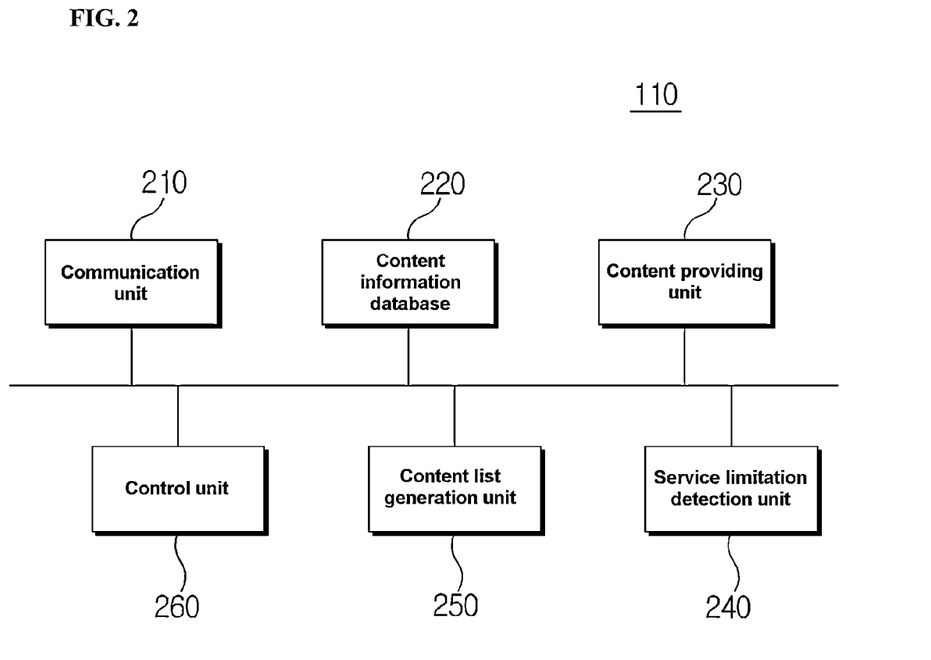
FIG. 2 is a diagram illustrating the configuration of the function blocks of a DMS in accordance with an embodiment of the present invention.

FIG. 2 is a diagram illustrating the configuration of the function blocks of the DMS 110 in accordance with an embodiment of the present invention.

Referring to FIG. 2, the DMS 110 in accordance with an embodiment of the present invention includes a communication unit 210, a content information database (DB) 220, a content providing unit 230, a service limitation detection unit 240, a content list generation unit 250, and a control unit 260.

The communication unit 210 communicates with the plurality of DMPs 130~134 over the communication network 120.

The content information DB 220 stores media content and a content list to be provided to the plurality of DMPs 130~134.

The content providing unit 230 provides media content and a content list to the plurality of DMPs 130~134.

The service limitation detection unit 240 detects service limitation regarding the providing of media content.

The content list generation unit 250 sorts unable content from a content list and generates an unable content list using the unable content.

If limitation, such as a service restriction regarding the providing of media content, is generated, the control unit 260 sends service limitation information to the plurality of DMPs 130~134. When a request for an unable content list is received from one of the plurality of DMPs 130~134, the control unit 260 performs control so that unable content is sorted from a content list and an unable content list is generated and sent to the corresponding DMP.

Furthermore, the control unit 260 controls the communication unit 210 so that it sends service limitation information using a multicast method and controls the communication unit 210 so that it sends an unable content list using a unicast method.

Furthermore, the control unit 260 performs control so that service limitation information is transmitted to the plurality of DMPs 130~134 through an SSDP notification using a multicast method.

Figure 3:
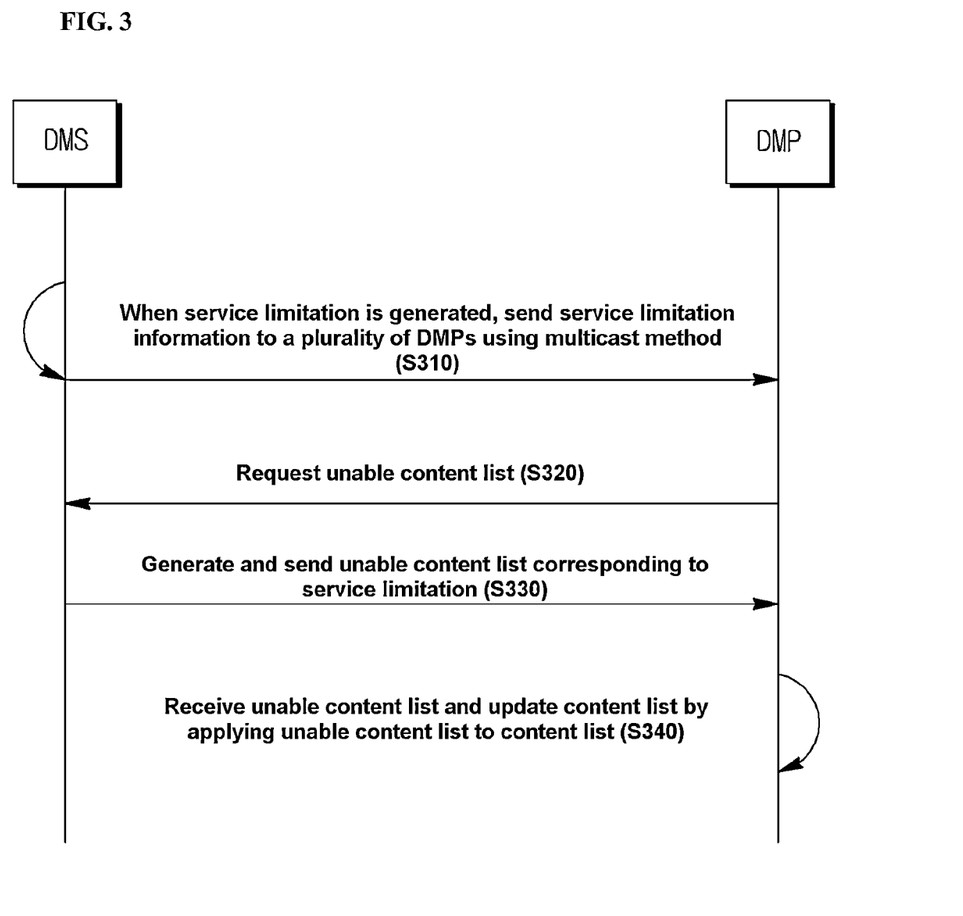
FIG. 3 illustrates an overall flowchart illustrating a method for updating information capable of providing media content in accordance with an embodiment of the present invention.

FIG. 3 illustrates an overall flowchart illustrating a method for updating information capable of providing media content in accordance with an embodiment of the present invention.

Referring to FIG. 3, when service limitation is generated, the DMS 100 of the system 100 for updating information capable of providing media content in accordance with an embodiment of the present invention sends service limitation information to the plurality of DMPs 130~134 using a multicast method at step S310.

In this case, the DMS 110 sends the service limitation information to the plurality of DMPs 130~134 through an SSDP notification using a multicast method.

One (e.g., 130) of the plurality of DMPs 130~134 which have received the service limitation information using a multicast method requests an unable content list from the DMS 110 at step S320.

In response to the request, the DMS 110 generates an unable content list corresponding to the service limitation and sends the unable content list to the DMP 130 at step S330.

In this case, the DMP 130 requests the unable content list from the DMS 110 using a unicast method, and the DMS 110 also sends the unable content list to the DMP 130 using a unicast method.

Accordingly, when the unable content list is received, the DMP 130 updates an existing content list by applying the unable content list to the existing content list at step S340.

Figure 4:
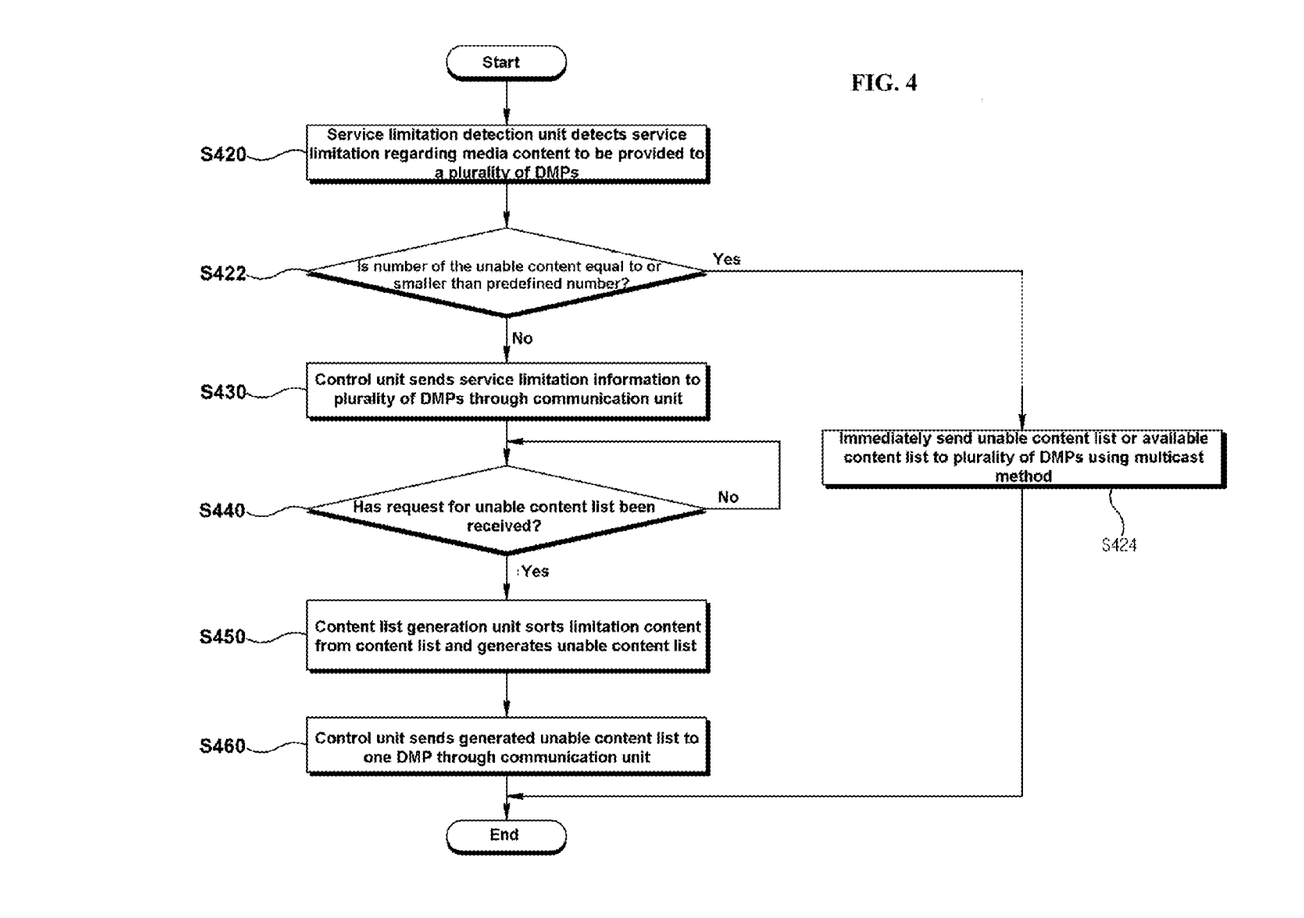
FIG. 4 is a diagram illustrating is a flowchart illustrating a method of updating, by the DMS, information capable of providing media content in accordance with an embodiment of the present invention.

FIG. 4 is a diagram illustrating is a flowchart illustrating a method of updating, by the DMS 110, information capable of providing media content in accordance with an embodiment of the present invention.

Referring to FIG. 4, the service limitation detection unit 240 of the DMS 110 in accordance with an embodiment of the present invention detects service limitation regarding media content to be provided to the plurality of DMPs 130~134 at step S420.

Figure 5:
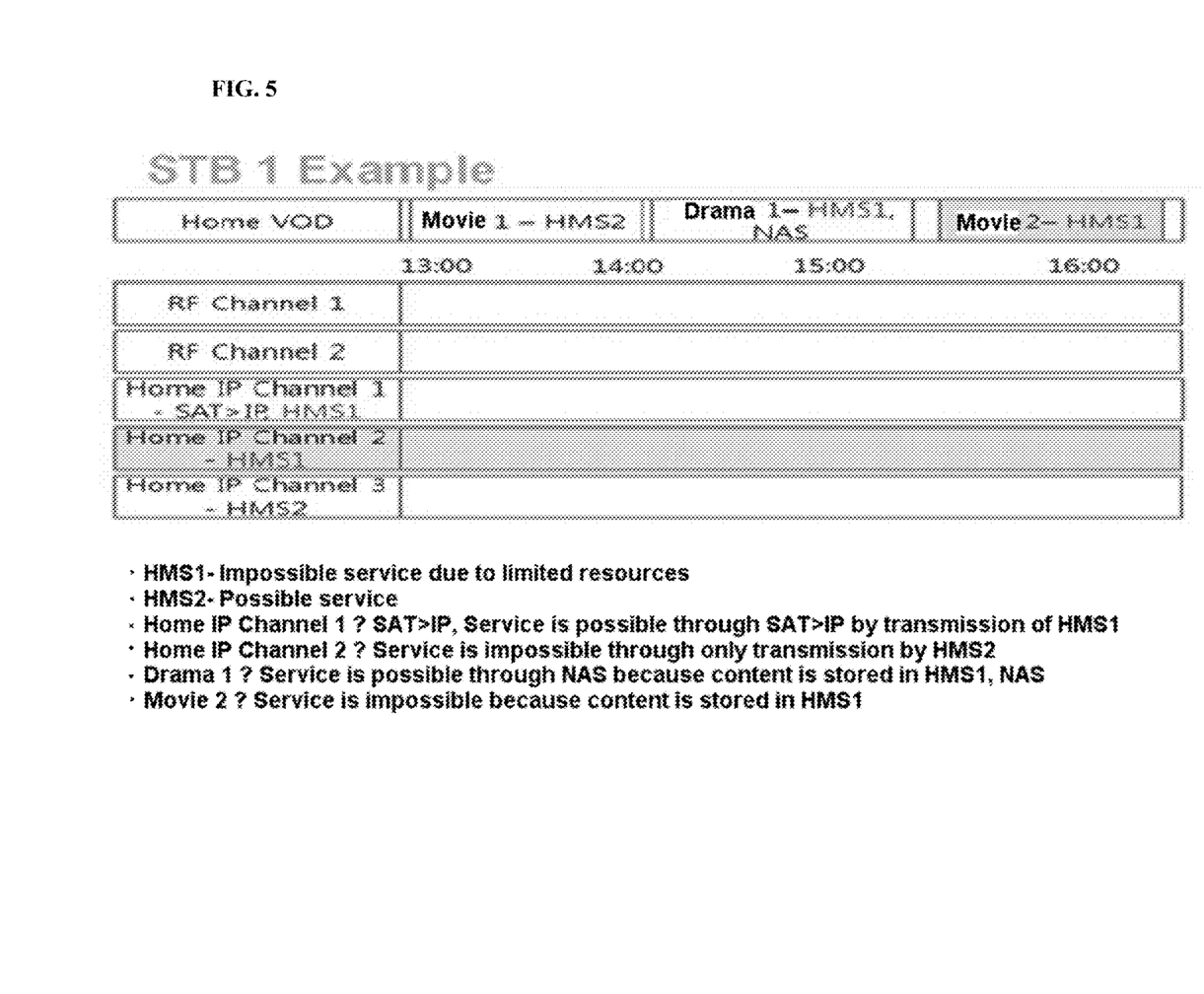
FIG. 5 is a diagram illustrating an example in which media content to be provided to a plurality of DMPs includes service limitation in accordance with an embodiment of the present invention.

That is, as illustrated in FIG. 5, the service limitation detection unit 240 detects whether or not the media content to be provided to the plurality of DMPs 130~134 cannot be served due to limited resources as in HMS1, the media content cannot be served because it is stored in HMS1 as in Movie 2, or the media content cannot be served because it can be transmitted only in HMS1 as in Home IP Channel 2. FIG. 5 is a diagram illustrating an example in which media content to be provided to the plurality of DMPs includes service limitation in accordance with an embodiment of the present invention. Furthermore, cases where media content includes service limitation may include a case where IP channels are no longer used because all the tubers are used, a case where HDD performance no longer provides service due to several types of simultaneous recording and playback, and a case where a Wi-Fi network band is insufficient.

If service limitation is detected and the number of the unable content is equal to or smaller than a predefined number (Yes at step S422), the control unit 260 performs controls so that an unable content list or an available content list is immediately transmitted to the plurality of DMPs 130~134 using a multicast method at step S424.

If the number of the unable content is greater than the predefined number (No at step S422), the control unit 260 generates service limitation information and controls the communication unit 210 so that it sends the service limitation information to the plurality of DMPs 130~134 at step S430.

That is, the communication unit 210 sends the service limitation information using a multicast method and sends the service limitation information to the plurality of DMPs through an SSDP notification using a multicast method.

Thereafter, the control unit 260 receives a request for an unable content list from one (e.g., 130) of the plurality of DMPs 130~134 through the communication unit 210 at step S440.

Thereafter, the content list generation unit 250 sorts unable content from a content list and generates an unable content list using the unable content at step S450.

The control unit 260 controls the communication unit 210 so that it sends the generated unable content list to the DMP 130 at step S460.

In this case, the communication unit 210 sends the unable content list using a unicast method.

As described above, the present invention can realize the system and method for updating information capable of providing media content, wherein when a service restriction is generated in a DMS in a home network system based on DLNA, a home multicast group is notified of the service restriction and DMPs belonging to the home multicast group receive information about content that is unable to be served from the DMS and notify users of the information.

In accordance with the present invention, a user can determine whether or not media content can be served and conveniently use the media content because a DMP (e.g., a set-top box) receives information about content that cannot be served from the DMS and notifies a user of the information.

Those skilled in the art to which the present invention pertains will understand that the present invention may be implemented in various detailed forms without changing the technical spirit or indispensable characteristics of the present invention. It will be understood that the aforementioned embodiments are illustrative and not limitative from all aspects. The scope of the present invention is defined by the appended claims rather than the detailed description, and the present invention should be construed as covering all modifications or variations derived from the meaning and scope of the appended claims and their equivalents.

What is claimed is:

1. A method for updating service information of media content in a Digital Media Server (DMS), the method comprising:
   detecting, a service restriction of media content to be provided to a plurality of Digital Media Players (DMPs), wherein the DMS and the plurality of DMPs are used in a home network system based on Digital Living Network Alliance (DLNA);
   immediately transmitting using a unicast method an unavailable content list or an available content list to the plurality of DMPs when a number of unavailable content is equal to or smaller than a predefined number; and
   transmitting, service limitation information regarding the media content to the plurality of DMPs using a multicast method when the number of unavailable content is greater than the predefined number, wherein transmitting the service limitation information regarding the media content to the plurality of DMPs further comprises,
   receiving, a request for an unavailable content list from a specific DMP of the plurality of DMPs sorting, the unavailable content from a content list,
   generating the unavailable content list using the unavailable content, and
   transmitting, the unavailable content list to the specific DMP.

2. The method according to claim 1, further comprising: transmitting the service limitation information to the plurality of DMPs through a Simple Service Discovery Protocol (SSDP) notification using the multicast method.

3. The method according to claim 1, wherein the service restriction comprises a case where the media content cannot be served to the plurality of DMPs due to limited resources.

4. A Digital Media Server (DMS) for providing media content to a plurality of Digital Media Players (DMPs), comprising:
   a communicator comprising a processor and memory to communicate with the plurality of DMPs;
   a content information database (DB) being operable to store the media content and a content list to be provided to the plurality of DMPs;
   a content provider being operable to provide the media content and the content list to the plurality of DMPs;
   a service limitation detector being operable to detect a service restriction the media content to be provided to the plurality of DMPs, wherein the DMS and the plurality of DMPs are used in a home network system based on Digital Living Network Alliance (DLNA);
   a content list generator being operable to sort unavailable content from the content list and generate an unavailable content list using the unavailable content;
   a controller being operable to immediately transmit using a unicast method the unavailable content list or an available content list to the plurality of DMPs when the service restriction of media content to be provided to the plurality of DMPs is detected and a number of the unavailable content is equal to or smaller than a predefined number; and
   the controller further being operable to transmit service limitation information to the plurality of DMPs using a multicast method when the service restriction of media content to be provided to the plurality of DMPs is detected and the number of unavailable content is greater than the predefined number, wherein transmitting the service limitation information to the plurality of DMPs further comprises:
   sorting the unavailable content from the content list and generating the unavailable content list using the sorted unavailable content when a request for the unavailable content list is received from a specific DMP of the plurality of DMPs in response to the transmitted service limitation information, and
   transmitting the unavailable content list to the specific DMP.

5. The DMS according to claim 4, wherein the controller is being operable to transmit the service limitation information to the plurality of DMPs through a Simple Service Discovery Protocol (SSDP) notification using the multicast method.

6. The DMS according to claim 4, wherein the controller is being operable to immediately send the unavailable content list or an available content list to the plurality of DMPs using the multicast method.

7. A non-transitory computer readable medium storing instructions that when executed by a computer cause the computer to perform a method for updating service information of media content in a Digital Media Server (DMS), the method comprising:
   detecting, a service restriction of the media content to be provided to a plurality of Digital Media Players (DMPs), wherein the DMS and the plurality of DMPs are used in a home network system based on Digital Living Network Alliance (DLNA);
   immediately sending using a unicast method an unavailable content list or an available content list to the plurality of DMPs when the service restriction is detected and a number of unavailable content is equal to or smaller than a predefined number; and
   sending service limitation information to the plurality of DMPs using a multicast method when the service restriction is detected and the number of unavailable content is greater than the predefined number, wherein transmitting the service limitation information regarding the media content to the plurality of DMPs further comprises,
   wherein sending the service limitation information to the plurality of DMPs further comprises:
   receiving a request for the unavailable content list from a specific DMP of the plurality of DMPs,
   sorting the unavailable content from a content list and generating the unavailable content list using the unavailable content in response to the request, and sending the unavailable content list to the specific DMP.

8. The non-transitory computer readable medium according to claim 7, wherein sending the service limitation information to the plurality of DMPs when the service restriction is detected further comprises sending the service limitation information to the plurality of DMPs through a Simple Service Discovery Protocol (SSDP) notification using the multicast method.

9. The non-transitory computer readable medium according to claim 7, wherein immediately sending the unavailable content list or the available content list to the plurality of DMPs further comprises transmitting the unavailable content list or the available content list to the plurality of DMPs using the multicast method.

* * * * *